United States Patent [19]

Buma et al.

[11] Patent Number: 4,799,707
[45] Date of Patent: Jan. 24, 1989

[54] GAS SUSPENSION SYSTEM FOR EASIER START-UP OF A COMPRESSOR

[75] Inventors: Shuuichi Buma; Nobutaka Ohwa, both of Toyota; Osamu Takeda, Susono; Toshio Aburaya, Toyota, all of Japan

[73] Assignee: Toyota Jidosha Kabushiki Kaisha, Japan

[21] Appl. No.: 179,767

[22] Filed: Apr. 11, 1988

[30] Foreign Application Priority Data

Apr. 14, 1987 [JP] Japan .............................. 62-56323[U]

[51] Int. Cl.⁴ .............................................. B60G 11/26
[52] U.S. Cl. .................................... 280/711; 280/714; 280/707
[58] Field of Search ......... 280/6 R, 711, 714, DIG. 1, 280/707

[56] References Cited

U.S. PATENT DOCUMENTS

| | | | |
|---|---|---|---|
| 3,874,692 | 4/1975 | Ono | 280/711 |
| 4,245,854 | 1/1981 | Curnutt | 280/711 |
| 4,589,675 | 5/1986 | Braun et al. | 280/707 |
| 4,655,440 | 4/1987 | Eckert | 280/714 |
| 4,659,104 | 4/1987 | Tanaka et al. | 280/714 |

FOREIGN PATENT DOCUMENTS

61-43509 3/1986 Japan .

*Primary Examiner*—Kenneth R. Rice
*Attorney, Agent, or Firm*—Parkhurst, Oliff & Berridge

[57] ABSTRACT

In a gas suspension system for controlling a body attitude of a vehicle, a controller drives a compressor and control valves to supply compressed air to a high pressure reserve tank. After enough air is supplied to the high pressure reserve tank, the compressor is stopped and the control valves are shut, whereby high pressure air remains at the delivery port of the compressor. Then a specially provided connection control valve is opened for a predetermined period in order to put the delivery port of the compressor in communication with a low pressure reserve tank. The pressure at the delivery port thus can be decreased, resulting in less torque needed to start the compressor.

6 Claims, 6 Drawing Sheets

GAS SUSPENSION SYSTEM FOR EASIER START-UP OF A COMPRESSOR

BACKGROUND OF THE INVENTION

1. Field of the Invention

The present invention relates to an electronically controlled suspension system, more particularly, to a gas suspension system for controlling the body attitude of a vehicle having reserve tanks for holding compressed air which is supplied by a compressor.

2. Description of the Related Art

A well-known electronically controlled suspension system exists in which the gas compressed by a compressor is supplied to a gas spring provided with the suspension so as to control the body attitude of a vehicle. Such a system requires a motor with great capacity to generate enough torque for starting the compressor. Such a motor requires much electric current to be started, which can adversely effect other electric devices of the vehicle, such as lamps or audio equipment.

To solve the aforementioned problem, Japanese Published Unexamined patent application No. 61-43509 discloses a system in which, with the aim of reducing the starting torque of the compressor, the high pressure air compressed by the compressor and held within a high pressure reserve tank is returned to a suction port of the compressor for a preset period following the start-up of the compressor.

Although the starting torque is decreased in this suspension system, the high pressure air from the reserve tank is further compressed during the preset period to deliver the air at higher pressure than necessary because the high pressure of the reserve tank is also applied to the delivery port of the compressor. The decrease in the starting torque by the suspension system is therefore rather small and the air circuit at the delivery port of the compressor has to be constructed to have sufficient rigidity to resist the higher pressure.

SUMMARY OF THE INVENTION

It is therefore an object of the invention to provide a gas suspension system requiring less starting torque and delivering air at an appropriate pressure at the start-up of the compressor.

Figure 1:
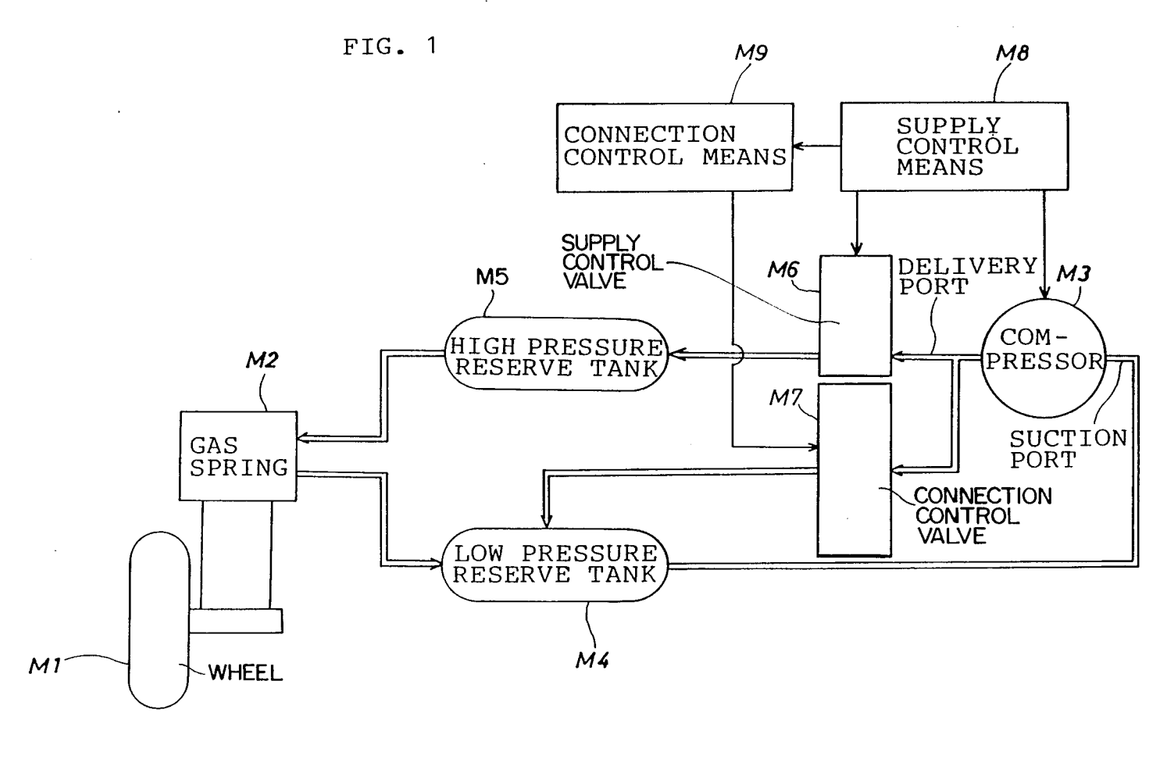
FIG. 1 is a block diagram illustrating the basic construction of the present invention.

In order to accomplish the above object, as FIG. 1 shows, the suspension system is so constructed to comprise: a gas spring M2 provided to a wheel M1 of a vehicle; a high pressure reserve tank M5 for holding gas to be supplied to the gas spring M2; a low pressure reserve tank M4 for receiving gas from the gas spring M2; a compressor M3 having a suction port and a delivery port for compressing the gas coming from the low pressure reserve tank M4 via the suction port in order to supply high pressure gas to the high pressure reserve tank M5 via the delivery port; a supply control valve M6 provided between the delivery port of the compressor M3 and the high pressure reserve tank M5; a connection control valve M7 provided provided the delivery port of the compressor M3 and the low pressure reserve tank M4; a supply control means M8 for controlling the supply control valve M6 used to supply the gas compressed by the compressor M3 to the high pressure reserve tank M5; and a connection control means M9 for controlling the connection control valve M7 to connect the delivery port of the compressor M3 with the low pressure reserve tank M4 when the gas is not supplied by the supply control means M8.

In the above-constructed system, the supply control means M8 supplies the compressed gas to the high pressure reserve tank M5 by driving and controlling the compressor M3 and the supply control valve M6. When the means M8 is not supplying the compressed gas, the connection control means M9 communicates the delivery port of the compressor M3 with the low pressure reserve tank M4 by controlling the connection control valve M7 for a given period. Therefore, when the compressor M3 is not delivering the gas, the pressure from the delivery port becomes approximately equal to that of the low pressure reserve tank M4, thereby reducing the torque needed to start the compressor M3.

BRIEF DESCRIPTION OF THE DRAWINGS

The object, features and advantages of the invention will become apparent upon reading the following detailed specification and drawings in which.

DESCRIPTION OF THE PREFERRED EMBODIMENTS

Hereinafter, one of the preferred embodiments will be described in detail with reference to the drawings.

Figure 2:
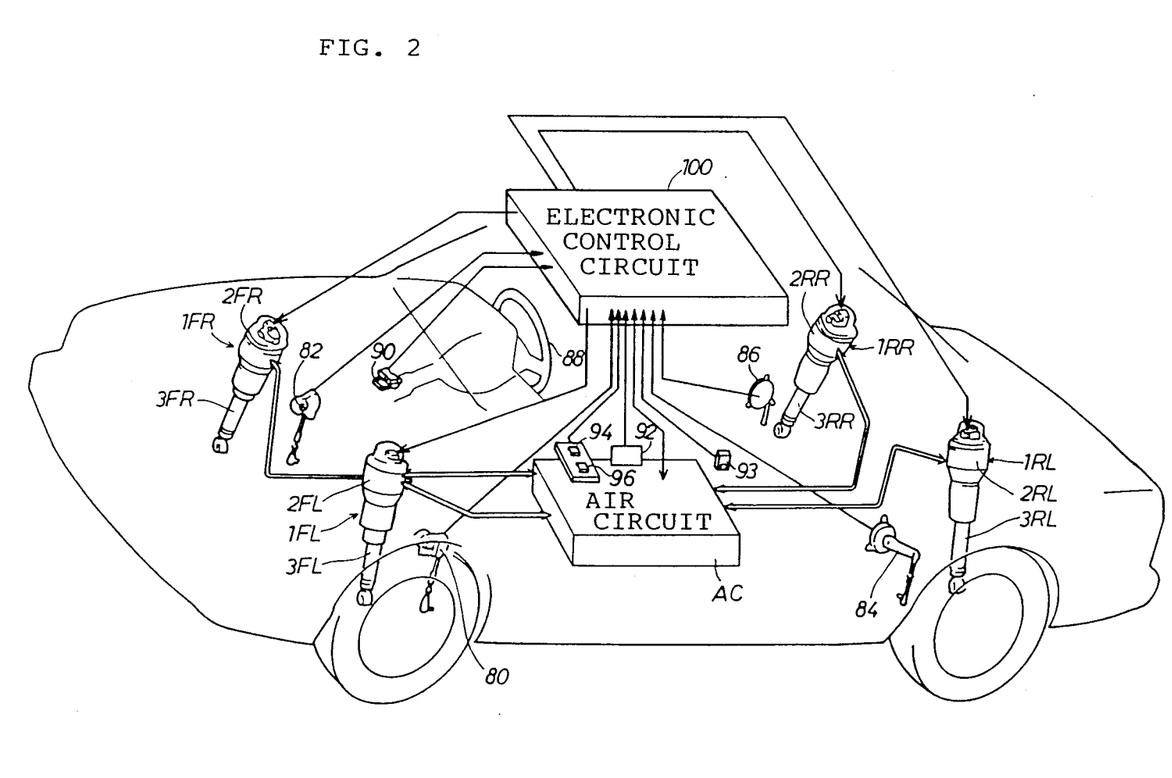
FIG. 2 is a schematic construction view of the electronically controlled suspension system according to an embodiment of the invention.
Figure 3:
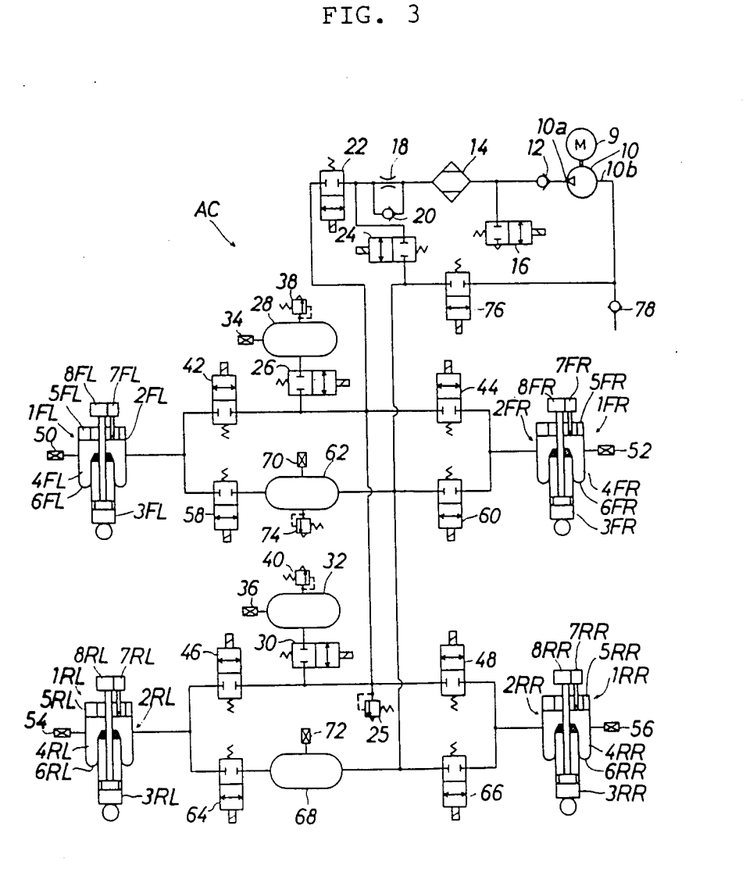
FIG. 3 is an air circuit diagram of the embodiment.

Referring to FIGS. 2 and 3, an electronicaly controlled suspension system according to one embodiment has suspensions 1FL, 1FR, 1RL and 1RR for a front left, a front right, a rear left and a rear right wheel, respectively, each of which is connected to an air circuit AC. The suspensions 1FL, 1FR, 1RL and 1RR are provided with gas springs 2FL, 2FR, 2RL and 2RR, and with shock absorbers 3FL, 3FR, 3RL and 3RR. Each gas spring, as shown in FIG. 3, has corresponding main gas chambers 4FL, 4FR, 4RL and 4RR, and corresponding sub gas chambers 5FL, 5FR, 5RL and 5RR. A part of each main gas chamber is composed of respective diaphragms 6FL, 6FR, 6RL, and 6RR so that a vehicle height can be varied by supplying the air to the main chambers, or discharging the air therefrom. By driving their corresponding spring motors, 7FL, 7FR, 7RL, and 7RR, connection between the main gas chambers and the sub gas chambers is opened or closed, or the air flow between them is adjusted to change the spring constant setting among the levels of "low", "medium" and "high". Also by driving corresponding absorber motors, 8FL, 8FR, 8RL and 8RR, oil flow passing through an orifice (not shown) within the absorber is adjusted in order to change the damping force among the levels of "low", "medium", and "high". The air circuit AC is provided with a compressor 10 driven by a motor 9 to supply the compressed air to each gas spring 2FL, 2FR, 2RL, and 2RR. A delivery port 10a of the compressor 10 is connected to both an air dryer 14 and a discharge valve 16 via a check valve 12 for preventing the back flow. The air dryer 14 is filled with silica gel in order to remove moisture contained in the compressed air. This dryer 14 is connected to one side of a supply valve 22 and a change-over valve 24 via a fixed throttle 18 and a check valve 20 for preventing the back flow. The other side of the supply valve 22 is connected to high pressure reserve tanks 28 and 32 of the front and rear wheels respectively, via respective high pressure reserve valves 26 and 30, as well as to a relief valve 25 for relieving air of a predetermined pressure. The tanks 28 and 32 are provided with respective pressure sensors 34 and 36 for detecting air pressures therein and with respective relief valves 38 and 40 set to operate at a predetermined pressure.

The other side of the valve 22 is further connected to the main gas chambers 4FL, 4FR, 4Rl, and 4RR via leveling valves 42, 44, 46, and 48, respectively. Each main gas chamber is provided with respective pressure sensors 50, 52, 54 and 56 for detecting the air pressure.

The main gas chambers 4FL and 4FR of the front wheels are connected to a low pressure reserve tank 62 via respective discharge valves 58 and 60. Similarly, the main gas chambers 4RL and 4RR of the rear wheels are connected to another low pressure reserve tank 68 via respective discharge valves 64 and 66. The low pressure reserve tanks 62 and 68 communicate with each other. They are provided with respective pressure sensors 70 and 72 for detecting the air pressure thereof. The low pressure reserve tank 62 is connected to a relief valve 74 set to operate at a predetermined pressure. Capacity of the low pressure reserve tanks 62 and 64 is equal to that of the aforementioned high pressure reserve tanks 28 and 32.

The tanks 62 and 68 are connected to a suction port 10b of the compressor 10 via a suction valve 76, as well as to the other side of the change-over valve 24. The suction port 10b is connected to a check valve 78 so as to take in atmospheric air. An alternative embodiment of the present invention could exclude the check valve 78 and feature the air circuit AC as a completely closed circuit within which air or any other gas, e.g., nitrogen, is utilized as the medium.

In this embodiment, two-position valves of normally closed type are used for the discharge valve 16, supply valve 22, change-over valve 24, high pressure reserve valves 26 and 30, leveling valves 42, 44, 46 and 48, discharge valves 58, 60, 64 and 66, and the suction valve 76.

In the air circuit AC, two sets of a high-pressure reseve tank and low pressure reserve tank, i.e., 28 and 62, and 32 and 68 are provided at the front and rear wheels respectively. However, a single set can be commonly used for both the front and rear wheels.

The supply valve 22 serves as the supply control valve of the invention and the change-over valve 24 as the connection control valve of the invention.

In this embodiment, as shown in FIG. 2, height sensors 80, 82, 84 and 86 are provided for detecting respective vehicle height, i.e., the distance between the vehicle body and each wheel. The system of this embodiment also has: a steering angle sensor 90 for detecting the steerig angle and direction of a steering wheel 88; an acceleration sensor 92 for detecting the amount of acceleration of the vehicle; and a vehicle speed sensor 93 for detecting vehicle speed based on the rotational speed of an output axis of a transmission (not shown). The system further includes a high switch 94 and a low switch 96 for manually setting the vehicle height.

Figure 4:
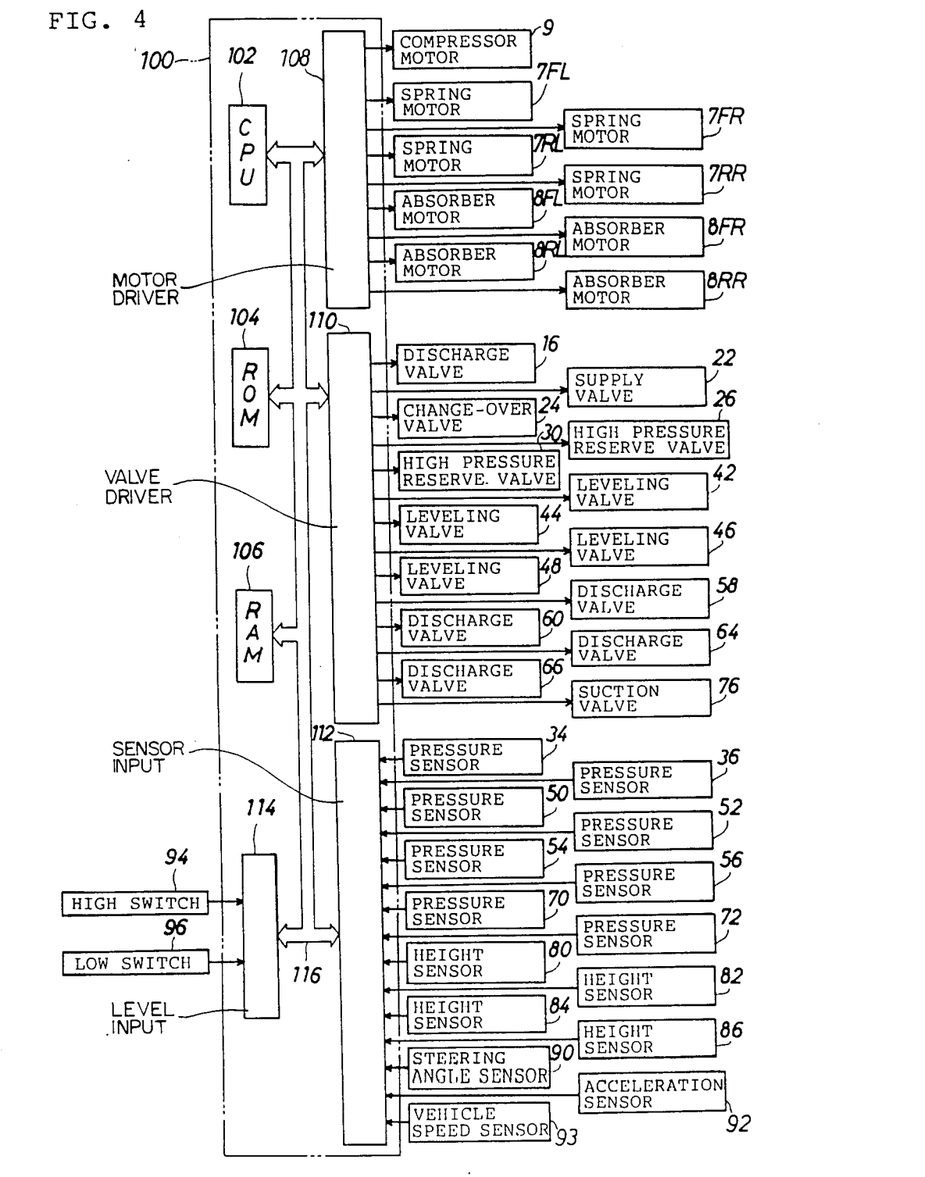
FIG. 4 is a block diagram illustrating the electric system of the embodiment.

Hereinafter, the electric system applied to the present embodiment will be described referring to a block diagram of FIG. 4.

An electronic control circuit 100 is connected to the suspensions 1FL, 1FR, 1RL and 1RR for controlling the body attitude of the vehicle. The electronic control circuit 100 includes a well-known CPU 102, ROM 104, and RAM 106 as a logic control circuit. The CPU 102, ROM 104 and RAM 106 are connected to I/O circuits, i.e., a motor driver 108, a valve driver 110, a sensor input circut 112, and a level input circuit 114 for interfacing external devices via a common bus 116.

The CPU 102 inputs signals from pressure sensors 34, 36, 50, 52, 54, 56, 70, and 72, height sensors 80, 82, 84, and 86, the steering sensor 90, the acceleration sensor 92, and the vehicle speed sensor 93 through the sensor input circuit 112, as well as the signals from the high switch 94 and the low switch 96 via the level input circuit 114. Then, depending on those input signals and the data in the ROM 104 and RAM 106, the CPU 102 outputs signals to drive a compressor motor 9, spring motors 7FL, 7FR, 7RL, and 7RR, and absorber motors 8FL, 8FR, 8RL and 8RR via the motor driver 108. It also outputs signals to drive the discharge valve 16, the supply valve 22, the change-over valve 24, the high pressure reserve valves 26 and 30, the leveling valves 42, 44, 46 and 48, the discharge valves 58, 60, 64 and 66, and the suction valve 76. Consequently each suspension 1FL, 1FR, 1RL and 1RR can be controlled.

Figure 5:
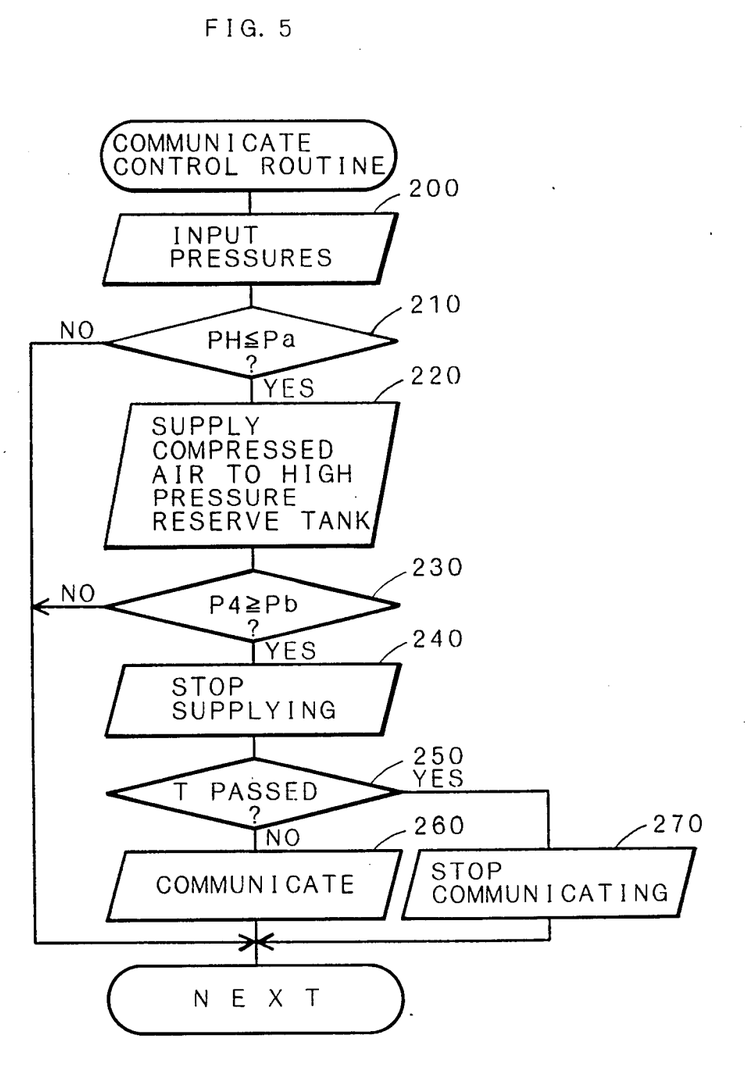
FIG. 5 is a flowchart illustrating an example of a control routine executed in the control circuit of the embodiment.

Referring to FIG. 5, a flowchart illustrates a routine for controlling communication between the compressor 10 and each reserve tank 28, 32, 62 and 68, which is executed by the electronic control circuit 100.

Upon operating a key switch (not shown), the communication control routine is repeatedly executed along with other control routines for controlling the suspension system of the present invention. First, at step 200, pressures in each reserve tank 28, 32, 62 and 68, i.e., PFH, PRH, PFL and PRL are detected by pressure sensors 28, 36, 70 and 72 and the signals are input through the sensor input circuit 112.

At step 210, it is determined whether a total pressure PH, which is a sum of the pressures in the two high pressure tanks PFH and PRH, is a predetermined minimum pressure Pa, e.g. 24 atm (absolute pressure), or less. If the determination is YES, which means that the high pressure reserve tanks 28 and 32 cannot supply the air to each main gas chamber 4FL, 4FR, 4RL, and 4RR, and so cannot control the body attitude of the vehicle, the program proceeds to step 220. At step 220, the compressor 10 is driven by the compressor motor 9 via the motor driver 108. At the same time, the supply valve 22, high pressure reserve valves 26 and 30, and the suction valve 76 are energized via the valve driver 110. Then, the air held in the low pressure reserve tanks 62 and 68 is compressed by the compressor 10 in order to be driven to the high pressure reserve tanks 28 and 32 via the check valve 20, the supply valve 22, and the high pressure reserve valves 26 and 30. In case pressure PFL and PRL in the low pressure reserve tanks 62 and 68 becomes less than the atmospheric pressure, outside air is sucked therein via the check valve 78.

At step 230, it is determined whether a total pressure P4, which is a sum of the pressures PFH, PRH, PFL, and PRL in all the reserve tanks 28, 32, 62, and 68, is a predetermined pressure Pb, e.g. 35 atm (absolute pressure), or more. If the determination is YES, i.e., the total pressure P4 reaches a pressure sufficient for controlling the body attitude of the vehicle, and the program proceeds to step 240. At step 240, the compressor motor 9 stops driving the compressor 10 and stops energizing the valves 22, 26, 30 and 76, thus stopping the supply of compressed air to the high pressure reserve tanks 28 and 32. At this time, the high pressure compressed air remains between the delivery port 10a of the compressor 10 and the supply valve 22, most of it within the air dryer 14.

Then at step 250, it is determined whether a predetermined discharge time T. e. g. 0.5 second, has passed. The discharge time T is the length required to completely discharge the remaining high pressure compressed air to the low pressure reserve tanks 62 and 68. If the determination is NO, at step 260, the change-over valve 24 is energized to communicate low pressure reserve tanks 62 and 68 with the space between the delivery port 10a and the supply valve 22. Therefore the compressed air remaining between the port 10a and the valve 22 can be discharged to the low pressure reserve tanks 62 and 68. If the determination at step 250 is YES, i.e., the discharge time T has passed, step 270 discontinues the communication by inactivating the change-over valve 24. Conversely, if the determination at either step 210 or step 230 is NO, or if the processing at either step 260 or step 270 is executed, the program exists to NEXT.

Step 210 and 240 each serves as the supply control means, and step 250 and 270 each as the connection control means. The embodiment uses the total pressures PH of high pressure reserve tanks and P4 of all the reserve tanks as criteria for the supply control means; however, the pressure of each tank PFH, PFL, PRH and PRL can be independently used for the criteria. In case each reserve tank 28, 32, 62 and 68 has a different or variable capacity, the product of the pressure and the capacity of each tank may be available for the criteria.

In summary, in the aforementioned suspension system of the invention, the compressor 10 is driven, and the supply valve 22, high pressure reserve valves 26 and 30, and the suction valve 76 are energized so as to supply the compressed air to the high pressure reserve tanks 28 and 32. During a given discharge time T after the air supply is stopped, the change-over valve 24 is energized to discharge the high pressure compressed air remaining between the delivery port 10a and the supply valve 22 to the low pressure reserve tanks 62 and 68. The system thus allows no compressed air to remain between the delivery port 10a and the supply valve 22, by which the pressure at the delivery port 10a becomes almost equal to PFL and PRL, the relatively lower pressures of the low pressure reserve tanks. Therefore, the pressure difference between fore-front and back-front of the piston of the compressor 10 can be reduced when the compressor 10 is started after the total pressure PH becomes less than the minimum pressure Pa, resulting in easy re-starting of the compressor 10 using less start driving torque and less power consumption by the compressor motor 9. As a result, the motor 9 with smaller capacity can easily start the compressor 10 and no deleterious effect is exerted on other electric devices such as the lamps or audio equipments. Also, the pressure of the delivered air does not become any higher than necessary, which eliminates the need for heavy piping.

Figure 6:
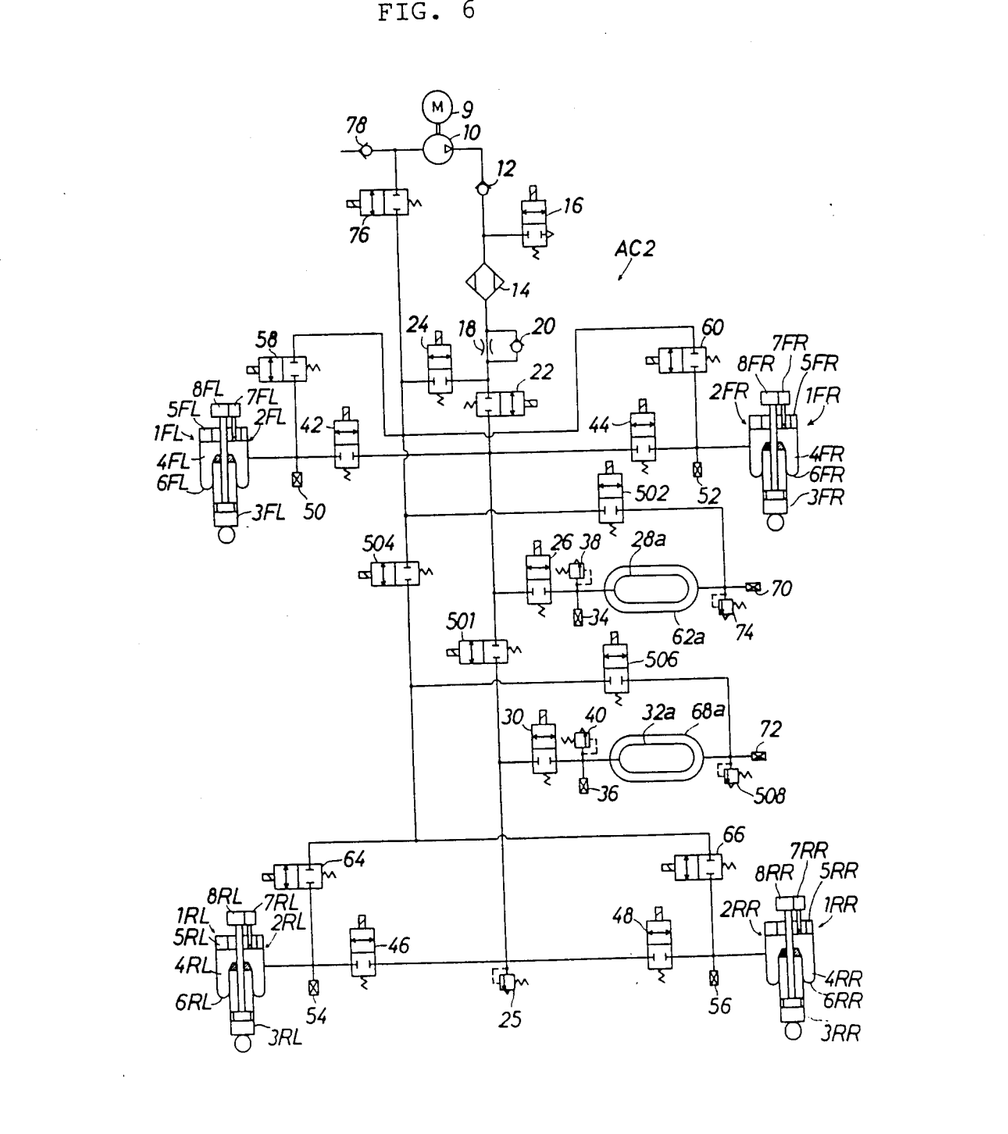
FIG. 6 is an air circuit diagram of another embodiment.

Referring to FIG. 6, another air circuit AC2 different from the AC in FIG. 3 will be described. In this air circuit AC2, the same components used in the AC are designated with the same numbers and explanations of their functions are omitted.

In the AC2, a high pressure reserve tank 28a and a low pressure reserve tank 62a are provided for the front wheels, and another set of high and low pressure reserve tanks 32a and 68a are provided for the rear wheels, and each set is concentrically constructed, i.e. the high pressure tank 28a, 32a is provided within the respective low pressure tank 62a, 68a. One end of the high pressure valve 26 connected to the high pressure reserve tank 28a is connected to one end of the high pressure valve 30 connected to the high pressure reserve tank 32a via a communicating valve 501. Even if the high pressure reserve valves 26 and 30 are simultaneously energized, the high pressure reserve tanks 28a and 32a do not communicate with each other unless the communicating valve 501 is energized.

One side of a low pressure valve 502 is connected to the low pressure reserve tank 62a. The other side of the valve 502 is connected to the suction valve 76 and discharge valves 58 and 60 of the front wheels, as well as to one side of a communicating valve 504. The other side of the valve 504 is connected to the low pressure reserve tank 68a and to the discharge valves 64 and 66 of the rear wheels via another low pressure valve 506. The low pressure reserve tank 68a is connected to a relief valve 508 set to operate at a predetermined pressure. Thus, the reserve tanks 62a and 68a are isolated from the other valves by the respective low pressure valves 502 and 506, and further, they cannot communicate with each other even when valves 502 and 506 are energized unless the communicating valve 504 is energized also. Namely, in the AC2 of this embodiment, each of the high pressure reserve tanks 28a and 32a and low pressure reserve tanks 62a and 68a has a corresponding tank valve 26, 30, 502 and 506 and the communication valves 501 and 504 are provided between the front and rear tanks. Therefore, the pressure of the each tank 28a, 32a, 62a and 68a can be controlled independently.

According to the suspension system of the invention, when the supply of the compressed air is stopped, the delivery port of the compressor becomes equal to that in the low pressure reserve tank in order to reduce the driving torque when the the compressor is started. This prevents the pressure of the output air from becoming higher than necessary. As a result, power consumption by the compressor motor can be reduced and its capacity can be minimized. Functions of other electric devices such as lamps, audio equipments are not influenced when the compressor is started.

As many apparent if widely different embodiments of this invention may be made without departing from the spirit and scope thereof, it is to be understood that the invention is not limited to the specific embodiments thereof except as defined in the appended claims.

What is claimed is:

1. A gas suspension system comprising:
   a gas spring (M2) provided for a wheel (M1) of a vehicle;
   a high pressure reserve tank (M5) for holding gas to be supplied to the gas spring;
   a low pressure reserve tank (M4) for receiving gas from the gas spring;
   a compressor (M3) having a suction port and a delivery port for compressing the gas coming from the low pressure reserve tank via the suction port in order to supply high pressure gas to the high pressure reserve tank via the delivery port;

a supply control valve (M6) provided between the delivery port of the compressor and the high pressure reserve tank;

a connection control valve (M7) provided between the delivery port of the compressor and the low pressure reserve tank;

a supply control means (M8) for controlling the supply control valve to supply the gas compressed by the compressor to the high pressure reserve tank; and a connection control means (M9) for controlling the connection control valve to connect the delivery port of the compressor with the low pressure reserve tank when the gas is not supplied by the supply control means.

2. A gas suspension system according to claim 1 wherein the supply control means starts supplying the gas when a pressure in the high pressure reserve tank is lower than a first value and stops supplying the gas when the pressure is higher than a second value, the first value being lower than the second value.

3. A gas suspension system according to claim 2 wherein the gas is air and the suction port of the compressor (10) is communicable with outside air via a check valve (78).

4. A gas suspension system according to claim 2 wherein:

the vehicle has four gas suspensions (2FR, 2FL, 2RR, 2RL) each provided for each wheel of the vehicle;

the vehicle has two high pressure reserve tank (28, 32) and two low pressure reserve tank (62, 68), one set of one of each provided for two of the gas suspensions and the other set provided for the other two gas suspensions; and the supply control means starts supplying the gas when a total pressure of the two high pressure reserve tanks is lower than a first value and stops supplying the gas when the total pressure is higher than a second value, the first value being lower than the second value.

5. A gas suspension system according to claim 4 wherein each of the four reserve tanks (28a, 32a, 62a, 68a) has an exclusive valve (26, 30, 502, 506) in order to control the pressures in each reserve tank independently.

6. A gas suspension system according to claim 5 wherein the high pressure reserve tank (28a, 32a) is provided within the low pressure reserve tank (62a, 68a).

* * * * *